United States Patent
Peng et al.

(10) Patent No.: US 12,341,725 B2
(45) Date of Patent: Jun. 24, 2025

(54) METHODS AND APPARATUSES FOR INTERFERENCE MITIGATION AND RELATED INTELLIGENT NETWORK MANAGEMENT

(71) Applicant: LENOVO (BEIJING) LIMITED, Beijing (CN)

(72) Inventors: Tao Peng, Beijing (CN); Yichen Guo, Beijing (CN); Xin Guo, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 514 days.

(21) Appl. No.: 17/769,238

(22) PCT Filed: Oct. 24, 2019

(86) PCT No.: PCT/CN2019/113062
§ 371 (c)(1),
(2) Date: Apr. 14, 2022

(87) PCT Pub. No.: WO2021/077365
PCT Pub. Date: Apr. 29, 2021

(65) Prior Publication Data
US 2023/0246791 A1    Aug. 3, 2023

(51) Int. Cl.
*H04L 5/00* (2006.01)
*H04W 72/541* (2023.01)

(52) U.S. Cl.
CPC .......... *H04L 5/0073* (2013.01); *H04L 5/0007* (2013.01); *H04W 72/541* (2023.01)

(58) Field of Classification Search
None
See application file for complete search history.

(56) References Cited

U.S. PATENT DOCUMENTS

| | | | | |
|---|---|---|---|---|
| 8,611,447 | B1 * | 12/2013 | Gomadam | H04B 7/0452 375/348 |
| 2010/0020709 | A1 * | 1/2010 | Ohm | H04B 7/0417 370/335 |
| 2010/0254344 | A1 | 10/2010 | Wei et al. | |
| 2019/0260557 | A1 * | 8/2019 | Zhang | H04W 72/23 |

FOREIGN PATENT DOCUMENTS

| | | |
|---|---|---|
| CN | 105898876 A | 8/2016 |
| EP | 2624614 A1 | 8/2013 |
| WO | 2019095922 A1 | 5/2019 |

OTHER PUBLICATIONS

International Searching Authority, "Written Opinion of the International Searching Authority," PCT/CN2019/113062, Jun. 24, 2020, pp. 1-3.

* cited by examiner

*Primary Examiner* — Diane L Lo
(74) *Attorney, Agent, or Firm* — Kunzler Bean & Adamson

(57) ABSTRACT

Embodiments of the present disclosure relate to a method and apparatus for uplink interference identification and SINR prediction. According to an embodiment of the present disclosure, a method can include: receiving first information including at least one channel quality measurement result associated with a first user equipment (UE) depending on interference caused by one or more second UEs; determining an interference vector for the first UE based on the at least one channel quality measurement result. Embodiments of the present disclosure can mitigate interference in ultra-dense network (UDN) for 5G and beyond.

20 Claims, 13 Drawing Sheets

| Entry # | TTI # | RB# | $C_2$ | | | ... | | $C_j$ | | SINR (dB) |
|---|---|---|---|---|---|---|---|---|---|---|
| | | | $u_{\{N_1\}+1}$ | ... | $u_{\{N_1\}+\{N_2\}}$ | ... | ... | $u_{I-1}$ | $u_I$ | |
| 1 | 1 | $RB_3$ | 1 | ... | 0 | ... | ... | 1 | 0 | ??? |
| 2 | | $RB_4$ | 0 | ... | 1 | ... | ... | 0 | 0 | ??? |
| 3 | 3 | $RB_{K-2}$ | 0 | ... | 0 | ... | ... | 0 | 1 | ??? |
| 4 | | $RB_{K-1}$ | 0 | ... | 0 | ... | ... | 0 | 0 | ??? |
| 5 | | $RB_K$ | 1 | ... | 0 | ... | ... | 1 | 0 | ??? |
| ⋮ | ⋮ | ⋮ | ⋮ | ⋮ | ⋮ | ⋮ | ⋮ | ⋮ | ⋮ | ⋮ |
| N-3 | t-2 | $RB_6$ | 0 | ... | 0 | ... | ... | 0 | 0 | ??? |
| N-2 | | $RB_7$ | 0 | ... | 0 | ... | ... | 0 | 1 | ??? |
| N-1 | t-1 | $RB_{12}$ | 0 | ... | 1 | ... | ... | 0 | 0 | ??? |
| N | t | $RB_1$ | 0 | ... | 0 | ... | ... | 0 | 0 | ??? |

FIG. 3A

| Entry # | TTI # | RB# | $C_2$ | | | ... | | $C_J$ | | SINR (dB) |
|---|---|---|---|---|---|---|---|---|---|---|
| | | | $u_{|N_1|+1}$ | ... | $u_{|N_1|+|N_2|}$ | ... | ... | $u_{J-1}$ | $u_J$ | |
| 1 | 1 | $RB_3$ | 1 | ... | 0 | ... | ... | 1 | 0 | 3.80497 |
| 2 | | $RB_4$ | 0 | ... | 1 | ... | ... | 0 | 0 | 10.856 |
| 3 | 3 | $RB_{K-2}$ | 0 | ... | 0 | ... | ... | 0 | 1 | ??? |
| 4 | | $RB_{K-1}$ | 0 | ... | 0 | ... | ... | 0 | 0 | ??? |
| 5 | | $RB_K$ | 1 | ... | 0 | ... | ... | 1 | 0 | ??? |
| ⋮ | ⋮ | ⋮ | ⋮ | ⋮ | ⋮ | ⋮ | ⋮ | ⋮ | ⋮ | ⋮ |
| N-3 | t-2 | $RB_6$ | 0 | ... | 0 | ... | ... | 0 | 0 | ??? |
| N-2 | | $RB_7$ | 0 | ... | 0 | ... | ... | 0 | 1 | ??? |
| N-1 | t-1 | $RB_{12}$ | 0 | ... | 1 | ... | ... | 0 | 0 | ??? |
| N | t | $RB_1$ | 0 | ... | 0 | ... | ... | 0 | 0 | ??? |

FIG. 3B

| Entry # | TTI # | RB# | $C_2$ | | | ... | | $C_J$ | | SINR (dB) |
|---|---|---|---|---|---|---|---|---|---|---|
| | | | $u_{|N_1|+1}$ | ... | $u_{|N_1|+|N_2|}$ | ... | ... | $u_{J-1}$ | $u_J$ | |
| 1 | 1 | $RB_3$ | 1 | ... | 0 | ... | ... | 1 | 0 | 3.80497 |
| 2 | | $RB_4$ | 0 | ... | 1 | ... | ... | 0 | 0 | 10.856 |
| 3 | 3 | $RB_{K-2}$ | 0 | ... | 0 | ... | ... | 0 | 1 | 19.0655 |
| 4 | | $RB_{K-1}$ | 0 | ... | 0 | ... | ... | 0 | 0 | 73.1232 |
| 5 | | $RB_K$ | 1 | ... | 0 | ... | ... | 1 | 0 | 4.65886 |
| ⋮ | ⋮ | ⋮ | ⋮ | ⋮ | ⋮ | ⋮ | ⋮ | ⋮ | ⋮ | ⋮ |
| N-3 | t-2 | $RB_6$ | 0 | ... | 0 | ... | ... | 0 | 0 | 11.0561 |
| N-2 | | $RB_7$ | 0 | ... | 0 | ... | ... | 0 | 1 | 23.2665 |
| N-1 | t-1 | $RB_{12}$ | 0 | ... | 1 | ... | ... | 0 | 0 | 12.2965 |
| N | t | $RB_1$ | 0 | ... | 0 | ... | ... | 0 | 0 | 74.5114 |

FIG. 3C

METHODS AND APPARATUSES FOR INTERFERENCE MITIGATION AND RELATED INTELLIGENT NETWORK MANAGEMENT

TECHNICAL FIELD

Embodiments of the present application generally relate to wireless communication technology, and in particular to methods and apparatuses for interference mitigation and related intelligent network management.

BACKGROUND

In a small-scale wireless service hotspot area, to satisfy the massive demand for services and throughput, the network operator would deploy large amount of network devices and build an ultra-dense network (UDN). Although UDN can bring a considerable capacity growth, in actual deployment, UDN may face enormous challenges. For example, as cell density increases, the inter-cell interference problem becomes more prominent, and the inter-cell interference is the most important factor limiting UDN performance.

Therefore, the industry desires an improved technology to mitigate interference in UDN for 5G and beyond.

SUMMARY OF THE APPLICATION

Some embodiments of the present application provide a technical solution for uplink interference identification and SINR prediction. For the sake of simplicity, only the case of uplink is introduced in this present application. However, persons skilled in the art can understand the technical solution disclosed by the present application can also be applied to the case of downlink. The counterpart methods and apparatuses in downlink can be obtained alike.

According to some embodiments of the present application, a method may include: receiving first information including at least one channel quality measurement result associated with a first user equipment (UE) depending on interference caused by one or more second UEs; determining an interference vector for the first UE based on the at least one channel quality measurement result.

In an embodiment of the present application, the method may further include: obtaining at least one predicted SINR value for the first UE based on the interference vector, wherein each of the predicted SINR corresponds to a second resource allocation configuration for the first UE and the one or more second UEs; selecting one of the at least one second resource allocation configurations for the first UE and the one or more second UEs based on the at least one predicted SINR value; and transmitting second information indicating a third resource allocation configuration for the first UE within the selected second resource allocation configuration.

According to some embodiments of the present application, a method may include: receiving a reference signal from a first UE; generating at least one channel quality measurement result based on the reference signal; transmitting first information including the at least one channel quality measurement result to a centralized unit (CU).

In an embodiment of the present application, the method may further include: receiving resource allocation configuration information for the first UE from the CU; and transmitting the resource allocation configuration information to the first UE.

Some embodiments of the present application also provide an apparatus, include: at least one non-transitory computer-readable medium having computer executable instructions stored therein, at least one receiver; at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present application provide a technical solution for uplink interference identification and SINR prediction. Accordingly, embodiments of the present application can mitigate interference in 5G ultra-dense network (UDN), and facilitate the deployment and implementation of the NR.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIGS. 3A-3C illustrates datasets associated with a resource allocation configuration according to some embodiments of the present application;

DETAILED DESCRIPTION

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
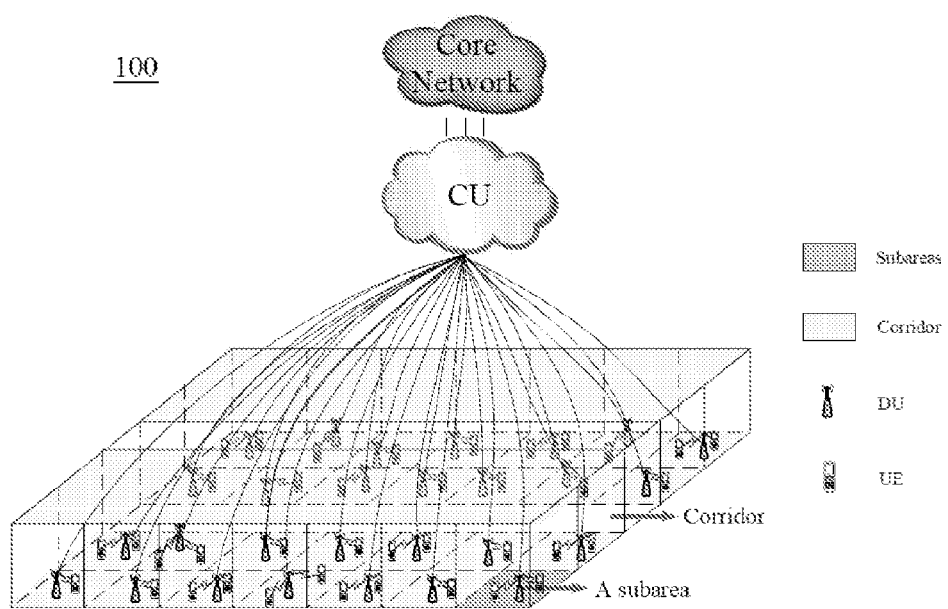
FIG. 1 illustrates an exemplary wireless communication system according to some embodiments of the present application.

FIG. 1 illustrates an exemplary wireless communication system according to some embodiments of the present application.

Referring to FIG. 1, a wireless communication system 100 can include a core network, a CU, a plurality of distributed units (DUs), and a plurality of UEs. The CU and the DU may be co-located within the same site, or may be physically apart. As shown in FIG. 1, the CU may serve an area in which the plurality of DUs and the plurality of UEs are located. Each of the plurality of DUs can serve one or more UEs in a subarea (e.g., a small cell or a cell) in which the DU is located. The wireless communication system 100 may achieve full coverage of a given area or may be geographically discontinuous in subarea coverage, such as including one or more corridors. Each UE may connect to its serving DU using an NR interface (e.g., Uu interface). Each of the plurality of DUs may connect to the CU using an F1 interface as defined in 3GPP TS 38.470.

The CU may include a computing system. For example, the computing system may include one or more servers or a super computer.

The DU may include partial or full protocols and functions of an access point (e.g., a femtocell access point), a Node-B, an evolved Node B (eNB), a gNB, a Home Node-B, a relay node, or other network device which may implement the technology in the present application.

The UE may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE may include wearable devices, such as smart watches, fitness bands, optical head-mounted displays, or the like. Moreover, the UE may be referred to as a subscriber unit, a mobile, a mobile station, a user, a terminal, a mobile terminal, a wireless terminal, a fixed terminal, a subscriber station, a user terminal, or a device, or described using other terminology used in the art. The UE may communicate directly with the DU via uplink (UL) communication signals.

As well known to persons skilled in the art, due to the limited frequency spectrum resource, in cellular networks, frequency resources are reused across the cells. Naturally, resource reusing induces the inter-cell interference, especially in the UDN with large cell density.

In 4G network, to solve the inter-cell interference, negotiation and signaling exchange between base stations with some enhancement technologies are utilized to satisfy the need of coordinative resource management. For instance, inter cell interference could be partially mitigated with the usage of ICIC and eICIC by exchanging information through X2 interface between base stations.

However, these methods in 4G network can only optimize resource allocation locally, and the performances of the enhancement technologies like ICIC/eICIC heavily rely on the availability, information exchange delay, stability of resource allocation scheme, and so on. These methods may be not suitable for the UDN which may deploy large amount of network devices in a hotspot area.

Given this, some embodiments of the present application provide an accurate model of the uplink interference in a real time manner with low computation complexity, and thus can mitigate interference in UDN.

During the uplink interference modeling, uplink interference identification and SINR prediction are the key problems. The interference model built by solving interference identification problem could be handily used in resource allocation algorithm to predict the channel quality, while SINR prediction is more useful to predict achievable SINR of the uplink (i.e., the link from the UE to the DU) of every user under a certain resource allocation situation.

In the case of uplink, interference identification may mean identifying the interference from any other UE to the uplink of a current UE. For example, assuming that U is a set of users, $u_m \in U$ and $u_m$ is severed by a $DU_{j_m}$ within a cell $C_{j_m}$, wherein $j_m$ is the index of the cell $C_{j_m}$. In addition, assuming that single-carrier frequency division multiple access (SC-FDMA) is chosen for multiple access scheme, that is, within a cell, each resource could be allocated to no more than one user. Based on the above assumptions, for any other UE $u_n$ which is not within the cell $C_{j_m}$ but share the same resource with $u_m$, the signal-to-interference ratio (SIR) of the uplink of the $u_m$ may be computed by the following equation:

$$\gamma_{m,n} = S_m^{j_m}/I_n^{j_m} \qquad (1)$$

Wherein $S_m^{j_m}$ is the signal power received by $DU_{j_m}$ from $u_m$, and $I_n^{j_m}$ is the signal power (also referred to as interference to the uplink of the $u_m$) received by $DU_{j_m}$ from $u_n$.

SINR prediction may mean predicting the SINR for the uplink of the current UE based on all other UEs which may cause interference to the uplink of the current UE. In the above example, the SINR of the uplink of the user $u_m$ may be computed by the following equation:

$$\gamma_m = S_m^{j_m}/\Sigma_{u_n \in \dot{U}_I} I_n^{j_m} + \sigma^2 \qquad (2)$$

Where $\sigma^2$ is the power of additive white Gaussian noise (AWGN), and $\dot{U}_I$ is the set of users which are not within the cell $C_{j_m}$ but share the same RB with $u_m$.

Embodiments of the present application can provide technical solutions for uplink interference identification and SINR prediction. More details on the embodiments of the present application will be illustrated in the following text in combination with the appended drawings.

Figure 2A:
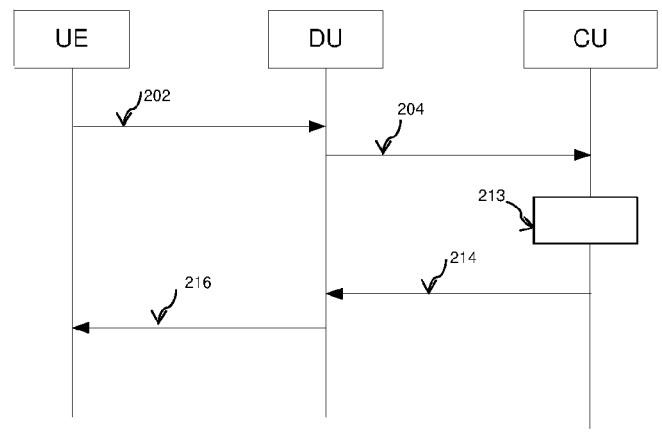
FIG. 2A illustrates a method for resource allocation according to some embodiments of the present disclosure.

FIG. 2A illustrates a method for resource allocation according to some embodiments of the present disclosure.

As shown in FIG. 2A, if a UE may have data to be transmitted to its serving DU, the UE may, in step 202, transmit a scheduling request to its serving DU through an NR interface (e.g., Uu interface). After receiving the scheduling request, at step 204, the DU may transmit the scheduling request from the UE to the CU through an F1 interface. In some cases, except for the scheduling request from the UE, the DU may also receive the scheduling request(s) from other UE(s) served by the serving DU, then at step 204, the DU may gather these scheduling requests together and transmit these scheduling requests to the CU.

After receiving the scheduling request from the DU, in step 213, the CU may generate a new resource allocation configuration for the UE based on at least one predicted SINR value derived from the uplink interference identification. The uplink interference identification may be established through steps 206-212 in FIG. 2B.

Figure 2B:
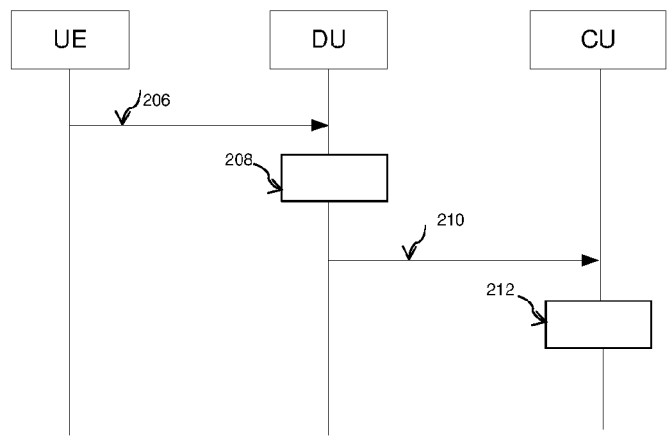
FIG. 2B illustrates a method for uplink interference identification according to some embodiments of the present disclosure.

FIG. 2B illustrates a method for uplink interference identification according to some embodiments of the present disclosure. At step 206, the UE may transmit a reference signal (e.g., channel state indication reference signal (CSI-RS)) to the DU through an NR interface (e.g., Uu interface). The reference signal may be transmitted on a set of resources based on a current resource allocation configuration for the UE.

Each resource of the set of resources may be determined by a unit in the time domain and a unit in the frequency domain. The unit in the time domain may correspond to at least one of the following: orthogonal frequency division multiplexing (OFDM) symbol, mini-slot, slot, transmission time interval (TTI), sub-frame, and frame. The unit in the frequency domain may correspond to at least one the following: resource element (RE), resource block (RB), sub-channel, resource pool (RP), band width part (BWP), frequency carrier, and frequency band.

The current resource allocation configuration for the UE may be stored in the CU. For example, FIG. 3A shows a dataset stored in the CU indicating the current resource allocation configuration for the UE and any other UE share the same resources as the UE.

As shown in FIG. 3A, denoting the set of cells within the area served by the CU as $C=\{C_1, C_2, \ldots, C_j, \ldots, C_J\}$, the set of users in the set of cells as $U=\{u_1, u_2, \ldots, u_i, \ldots, u_J\}$, and the set of resource blocks (RBs) used by the set of cells as $R=\{RB_1, RB_2, \ldots, RB_{K-2}, \ldots, RB_K\}$. Moreover, $N_1$ denotes the set of indexes of users in $C_1$ and $|N_1|$ denotes the number of users in set $N_1$; $N_2$ denotes the set of indexes of users in $C_2$ and $|N_2|$ denotes the number of users in set $N_2, \ldots$; and so forth for $N_J$. For interference avoidance, single-carrier frequency division multiple access (SC-FDMA) is chosen for multiple access scheme. That is, within a cell, each resource could be allocated to no more than one user.

FIG. 3A shows current resource allocation configuration for the UE (e.g., $u_1 \in U$ and $u_1$ is severed by $DU_1$ within the cell $C_1$) and the UEs in the cell other than $C_1$ which share the same resource with $u_1$. That is, in multiple TTIs (e.g., TTI #1, TTI #2, . . . , TTI #t), multiple RBs (e.g., RB3, RB4, . . . , RB1) are respectively allocated to $u_1$ for uplink transmission. However, these RBs may also be allocated for the UEs in the cell other than $C_1$ for uplink transmission. For example, Entry #1 in FIG. 3A means that in TTI #1, RB3 is allocated for user $u_1$ for uplink transmission and is also allocated for $u_{|N_1|+1}, u_{I-1}$ and maybe more users not shown in FIG. 3A which is denoted as "1", Entry #2 in FIG. 3A means that in TTI #1, RB4 is allocated for user $u_1$ for uplink transmission, is also allocated for $u_{|N_1|+|N_2|}$ and maybe more users not shown in FIG. 3A which is denoted as "1", . . . , and so forth for Entry #t, where t is an integer larger than 0 and not greater than N.

Please refer to FIG. 2B again. After receiving the reference signal on the set of resources according to the current resource allocation configuration, in step 208, the DU may generate at least one channel quality measurement result, wherein each of the at least one channel quality measurement result may be associated with the resource defined by the unit in the time domain and the unit in the frequency domain. In some embodiments, each of the at least one measurement result corresponds to a SINR value; in some other embodiments, each of the at least one measurement result corresponds to a reference signal received power (RSRP) value associated with the resource. The at least one channel quality measurement result may be generated by measuring the SINR or RSRP of the reference signal on the set of resources. For example, as shown in FIG. 3B, the DU may measure that the SINR value on RB3 in TTI #1 for the UE (e.g., $u_1 \in U$ and $u_1$ is severed within the cell $C_1$) is 3.80497 dB.

At step 210, the DU may transmit information including the at least one channel quality measurement result to a centralized unit (CU). In some embodiment, the information further includes at least one timestamp respectively corresponding to the at least one channel quality measurement result. The timestamp may correspond to generation time of the channel quality measurement result. Thus, the CU may use channel quality measurement results to generate the interference model, i.e., step 212.

In some other embodiments, the interference model may be trained by artificial intelligence (AI). The DU may transmit information including network operation data, e.g. the at least one channel quality measurement result, and feature data associated with the network operation data. The feature data may be collected together with or extracted from and stored together with the network operation data. The feature data can be used for intelligent network management. Intelligent network management means the network is managed automatically with less or even without human intervention. To this end, the feature data should help the intelligent network management entity to determine when and how the network operation entities should operate to generate or update outputs and deliver the outputs to other proper entity or entities. Thus, the feature data should at least include: timestamp of generation for each data, data type, data size, data quality, data volume, and etc.

According to some embodiments of the present disclosure, the information may also include an indicator implicitly or explicitly indicating an index of the unit in the time domain and another indicator implicitly or explicitly indicating an index of the unit in the frequency. These indicators may also be referred to as the network operation data. For example, as shown in FIG. 3B, the SINR value on RB3 in TTI #1 for the UE (e.g., $u_1 \in U$ and $u_1$ is severed within the cell $C_1$) is 3.80497 dB. In this example, one indicator may indicate the index of TTI #1 associated with 3.80497 dB and another indictor may indicate the index of RB3 associated with 3.80497 dB.

After receiving the information, the CU may map the at least one channel quality measurement result to the dataset indicating the current resource allocation configuration. As sated above, the CU may store the dataset as shown in FIG. 3A. The dataset as shown in FIG. 3A is for the UE $u_1$ (e.g., $u_1 \in U$ and $u_1$ is severed within the cell $C_1$). In fact, for each UE, the CU may store a dataset indicating resource allocation configuration similar as FIG. 3A. Based on the indicators indicating the resource in both time and frequency domain, the CU may know the channel quality measurement result is associated with which resource. For example, the indicators may indicate that the SINR value 3.80497 dB is associated with TTI #1 and RB3, and then the CU may map the SINR value 3.80497 dB to TTI #1 and RB3 as shown in FIG. 3B.

Referring to FIG. 3B, it shows a certain intermediate state of the mapping procedure. CU may repeat the receiving and mapping until the dataset is completed, and then the CU may obtain a complete dataset as shown in FIG. 3C.

Persons skilled in the art can understand that the incomplete dataset can also be used to train the interference model. However, since the precision of the trained interference model is heavily relied on the number of complete entries, it's recommended that the training process should be operated after all the entries of the dataset are completed.

Please refer to FIG. 2B again. After receiving the information including the at least one channel quality measurement result in step 210, the CU may generate the interference model in step 212.

Figure 4:
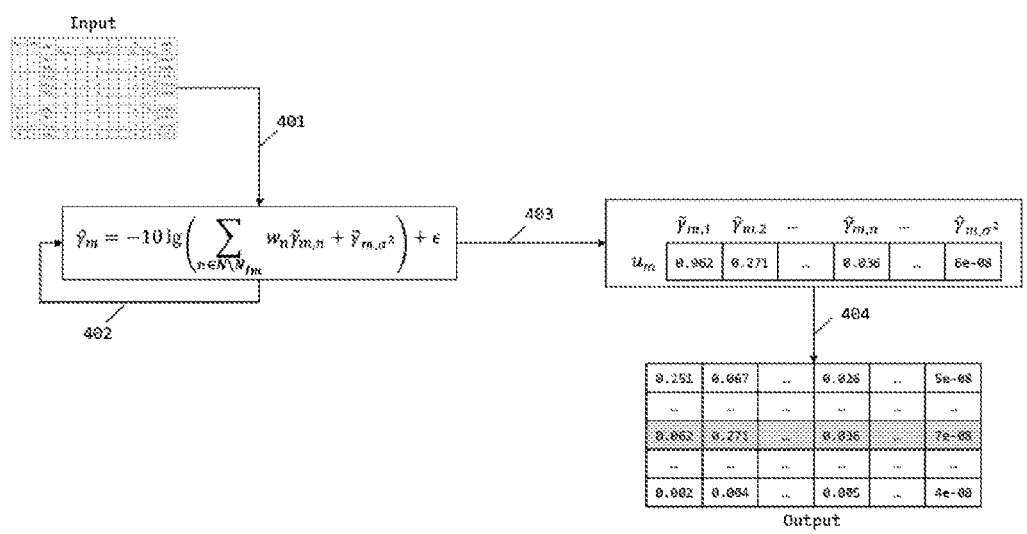
FIG. 4 illustrates a procedure for obtaining the uplink interference identification according to some embodiments of the present application.

The interference model may be obtained according to the procedure in FIG. 4. Specifically, FIG. 4 illustrates training the interference model by obtaining one or more uplink interference identifications in the form of one or more interference vectors according to some embodiments of the present application.

As shown in FIG. 4, in step 401, the dataset for the user $u_m$ (e.g., the dataset as shown in FIG. 3C for $u_1$) is inputted to the nonlinear least square regression algorithm (e.g., $\hat{\gamma}_m = -10 \lg (\Sigma_{n \in N \setminus N_{j_m}} w_n \tilde{\gamma}_{m,n} + \tilde{\gamma}_{m,\sigma^2}) + \epsilon$) as shown in FIG. 4. The nonlinear least square regression algorithm $\hat{\gamma}_m = -10 \lg (\Sigma_{n \in N \setminus N_{j_m}} w_n \tilde{\gamma}_{m,n} + \tilde{\gamma}_{m,\sigma^2}) + \epsilon$ may be derived from equations (3)-(7) as follows.

First, SINR value of arbitrary entry #k in the dataset for UE $u_m$ could be expressed as equation (3):

$$\gamma_m^{(k)} = \frac{S_m^{j_m}}{\sum_{n \in N \setminus N_{j_m}} w_n^{(k)} I_n^{j_m} + \sigma^2} \quad (3)$$

Wherein N is a set of indexes of all UEs within the area served by the CU, $N_{j_m} \subset N$ and is a set of indexes of UEs including the UE $u_m$ severed by a $DU_{j_m}$ within a cell $C_{j_m}$, wherein $j_m$ is the index of the cell $C_{j_m}$, $w_n^{(k)} \in \{0,1\}$ denotes whether $u_m$ is sharing the same RB with $u_n$ in entry #k and may be referred to as the resource allocation configuration, $u_n$ is UE not served by the $DU_{j_m}$ within a cell $C_{j_n}$, $S_m^{j_m}$ is the signal power received by $DU_{j_m}$ from $u_m$, and $I_n^{j_m}$ is the signal power (also referred to as interference to the uplink of the $u_m$) received by $DU_{j_m}$ from $u_n$.

Due to the continuous value of SINR and SIR results, the Interference Identification problem is a regression problem. However, there're many kinds of regression problem with different solutions, thus further derivation is required. Take the inversion of the SINR expression in equation (3), equation (3) may be transformed to the following equation (4):

$$\frac{1}{\gamma_m^{(k)}} = \frac{\sum_{n \in N \setminus N_{j_m}} w_n^{(k)} I_n^{j_m} + \sigma^2}{S_m^{j_m}} = \sum_{n \in N \setminus N_{j_m}} \frac{w_n^{(k)}}{\gamma_{m,n}} + \frac{1}{\gamma_{m,\sigma^2}} \quad (4)$$

Wherein $\gamma_{m,\sigma^2} = S_m^{j_m}/\sigma^2$ is the signal-to-noise ratio (SNR) of signal transmitted by $u_m$ and received by $DU_{j_m}$.

Denoting $$\tilde{\gamma}_m = \frac{1}{\gamma_m}, \tilde{\gamma}_{m,n} = \frac{1}{\gamma_{m,n}}, \tilde{\gamma}_{m,\sigma^2} = \frac{1}{\gamma_{m,\sigma^2}},$$

wherein $\gamma_{m,n}$ is defined in equation (1), the equation (4) is re-rewritten as the following equation (5):

$$\tilde{\gamma}_m^{(k)} = \Sigma_{n \in N \setminus N_{j_m}} w_n^{(k)} \tilde{\gamma}_{m,n} + \tilde{\gamma}_{m,\sigma^2} \quad (5)$$

It seems quite obvious that equation (5) is a linear least square regression algorithm. However, $\tilde{\gamma}_m^{(k)}$ is not directly provided in the dataset. To directly utilize data from dataset without conversion, SINR value in equation (5) should be expressed in decibel form in the following equation (6):

$$\hat{\gamma}_m^{(k)} = -10 \lg \tilde{\gamma}_m = -10 \lg(\Sigma_{n \in N \setminus N_{j_m}} w_n^{(k)} \tilde{\gamma}_{m,n} + \tilde{\gamma}_{m,\sigma^2}) \quad (6)$$

After the above transformation, equation (5) is turned into a nonlinear least square regression algorithm. After adding the missing error term, equation (6) may turn into the following equation (7):

$$\gamma m = -10 \lg(\Sigma_{n \in N \setminus N_{j_m}} w_n \tilde{\gamma}_{m,n} + \tilde{\gamma}_{m,\sigma^2}) + \epsilon \quad (7)$$

Where $\epsilon$ is the error term for capturing all the effects on $\hat{\gamma}_m^{(k)}$ by variables other than $\tilde{\gamma}_{m,n}$ and $\tilde{\gamma}_{m,\sigma^2}$.

With the nonlinear least square regression algorithm, the uplink interference identification problem can be solved. That is, by training $\tilde{\gamma}_{m,n}$ and $\tilde{\gamma}_{m,\sigma^2}$ for each interfering UE $u_n$, the interference identification problem is tackled. The output is the interference model, consisting of all the $\tilde{\gamma}_{m,n}$ and $\tilde{\gamma}_{m,\sigma^2}$. The whole process is illustrated in FIG. 4.

As shown in FIG. 4, after receiving the dataset for the UE $u_m$, at step 402, the CU may use the SINR values and $w_n$ in the dataset, iteratively compute the $\tilde{\gamma}_{m,n}$ and $\tilde{\gamma}_{m,\sigma^2}$ until the error between the SINR values in the dataset and the computed $\hat{\gamma}_m$ is below a preset threshold.

At step 403, the CU may put $\tilde{\gamma}_{m,n}$ and $\tilde{\gamma}_{m,\sigma^2}$ together as an interference vector for the UE $u_m$. In fact, for each UE in the area served by the CU, the CU may compute an interference vector for the UE. At step 404, the interference vector for the UE is generated. Furthermore, the interference vectors for other UEs in the area may be generated with the same operation. Thus, the interference model is formed with the above mentioned interference vectors.

As shown in FIG. 4, the interference model is stored in the form of interference matrix, in which row m represents interference vector for the uplink of the UE $u_m$, element in column n of row m (except the last column) represents a value associated with the SIR (e.g., the reciprocal of the SIR) received by $DU_{j_m}$ with signal from the UE $u_m$ and interference from the UE $u_n$, the element in the last column of row m represents a value associated with the SNR (e.g., the reciprocal of the SNR) for the uplink of the UE $u_m$.

Please refer to FIG. 2A again. With a generated interference model, the CU may generate a new resource allocation configuration in step 213 based on at least one predicted SINR value derived from the interference model. For example, after obtaining the $\tilde{\gamma}_{m,n}$ and $\tilde{\gamma}_{m,\sigma^2}$, the CU may obtain at least one predicted SINR value $\hat{\gamma}_m$ for uplink of the UE $u_m$ based on the following equation (8):

$$\hat{\gamma}_m = -10 \lg(\Sigma_{n \in N \setminus N_{j_m}} w_n \tilde{\gamma}_{m,n} + \tilde{\gamma}_{m,\sigma^2}) \quad (8)$$

Wherein $w_n \in \{0,1\}$ may be a new resource allocation configuration for the UE $u_m$ and other UE $u_n$. The CU may generate at least one new resource allocation configurations $w_n$ for the UE $u_m$ and other UE $u_n$. According to equation (8), each of the predicted SINR may correspond to a new resource allocation configuration for the UE $u_m$ and other UE $u_n$.

After obtaining the at least one predicted SINR value, the CU may select one of the at least one new resource allocation configurations for the UE $u_m$ and other UE $u_n$ based on the at least one predicted SINR value. For example, the new resource allocation configuration may be selected such that the predicted SINR value determined based on the selected new resource allocation configuration is the optimum value. In another example, the new resource allocation configuration may be selected if the predicted SINR value of the new resource allocation configuration is greater than a threshold. In yet another example, the new resource allocation configuration may be randomly selected from all of the new resource allocation configurations by which the predicted SINR value can fulfil the transmission requirement of the UE $u_m$.

After selecting one of the at least one new resource allocation configurations, in step 214, the CU may transmit information indicating a resource allocation configuration for the UE $u_m$ within the selected new resource allocation configuration to the $DU_{j_m}$. Persons skilled in the art can understand that the UE $u_m$ may refer to any one UE in the area served by the CU.

After receiving the resource allocation configuration for the UE, in step 216, the DU may transmit the resource allocation configuration to the UE. Then, the UE may transmit data according to the new resource allocation configuration.

Figure 5:
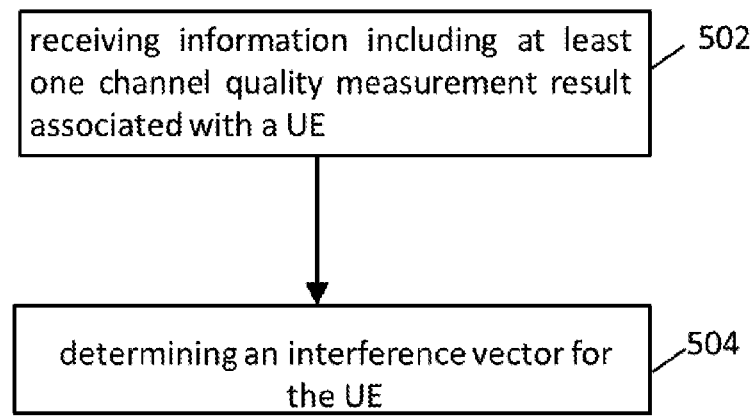
FIG. 5 illustrates a method for uplink interference identification and SINR prediction according to some embodiments of the present application.

FIG. 5 illustrates a method for uplink interference identification and SINR prediction according to some embodiments of the present application. The method may be performed by the CU as shown in FIG. 1.

As shown in FIG. 5, in step 502, the CU may transmit information including at least one channel quality measurement result associated with a UE depending on interference caused by one or more other UEs. The UE may refer to $u_m$ severed by a $DU_{j_m}$ within a cell $C_{j_m}$ and the one or more other UEs may refer to UEs other than the UE included in the cell $C_{j_m}$.

The information may further include feature data, the feature data may include at least one of: at least one timestamp respectively corresponding to the at least one channel quality measurement result; data type; data size; data quality; and data volume. The timestamp corresponds to generation time of the channel quality measurement result.

According to some embodiments of the present disclosure, each of the at least one channel quality measurement result may be associated with a resource determined by a unit in the time domain and a unit in the frequency domain. The unit in the time domain may correspond to at least one of the following: OFDM symbol, mini-slot, slot, transmission time interval (TTI), sub-frame, and frame. The unit in the frequency domain corresponds to at least one the following: resource element (RE), resource block (RB), sub-channel, resource pool (RP), band width part (BWP), frequency carrier, and frequency band. According to an embodiment of the present disclosure, each of the at least one channel quality measurement result may correspond to a signal to interference plus noise ratio (SINR) value or a reference signal received power (RSRP) value associated with the resource.

According to some embodiments of the present disclosure, the information may include an indicator implicitly or explicitly indicating an index of the unit in the time domain and another indicator implicitly or explicitly indicating an index of the unit in the frequency domain.

After receiving the information, the CU may determine an interference vector for the UE based on the at least one channel quality measurement result. According to an embodiment of the present disclosure, the interference vector may include one or more SIR values. According to another embodiment of the present disclosure, the interference vector may further include a SNR value.

According to some embodiments of the present disclosure, the CU may determine the interference vector further based on a current resource allocation configuration for the UE and the one or more other UEs. The current resource allocation configuration is for the UE and the one or more other UEs. According to an embodiment of the present disclosure, the CU may determine the interference vector by determining the interference vector, which includes one or more SIR values and a SNR value, with a nonlinear least square regression algorithm according to the at least one channel quality measurement result and the current resource allocation configuration.

After determine the interference vector, the CU may obtain at least one predicted SINR value for the UE based on the interference vector, wherein each of the predicted SINR corresponds to a candidate resource allocation configuration for the UE and the one or more other UEs. A new resource allocation configuration for the UE and the one or more other UEs is selected from the at least one candidate resource allocation configurations. Then, the CU may select one of the at least one candidate resource allocation configurations for the UE and the one or more other UEs based on the at least one predicted SINR value. After that, the CU may transmit another information indicating the new resource allocation configuration for the UE to the DU.

According to some embodiments of the present disclosure, the CU may determine an interference model. The interference model may be in the form of an interference matrix comprising the interference vector for the UE and one or more interference vectors for the one or more other UEs. For example, as shown in FIG. 4, the interference model is stored in the form of interference matrix, in which row m represents interference vector for the UE $u_m$, element in column n of row m (except the last column) represents a value associated with the SIR (e.g., the reciprocal of the SIR) received by $DU_{j_m}$ with signal from the UE $u_m$ and interference from the UE $u_n$, the element in the last column of row m represents a value associated with the SNR (e.g., the reciprocal of the SNR) for the UE $u_m$.

Figure 6:
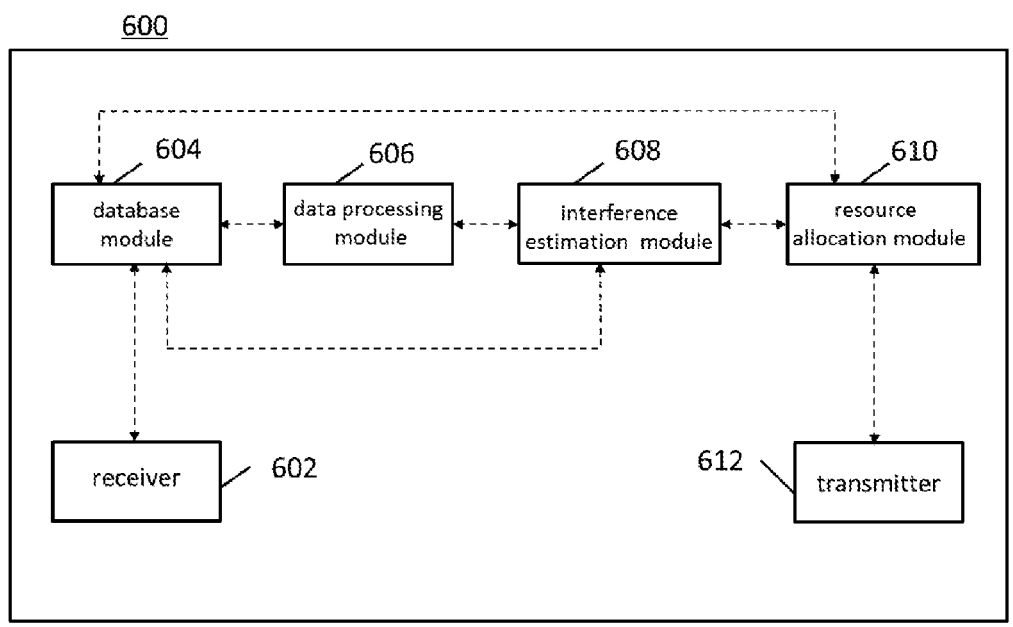
FIG. 6 illustrates a simplified block diagram of an apparatus for uplink interference identification and SINR prediction according to some embodiments of the present application.

FIG. 6 illustrates a simplified block diagram of an apparatus 600 for uplink interference identification and SINR prediction according to some embodiments of the present application. The apparatus 600 may be the CU as shown in FIG. 1.

Referring to FIG. 6, the apparatus 600 may include at least one receiver 602, database module 604, data processing module 606, interference estimation module 608, resource allocation module 610, and at least one transmitter 612. At least one receiver 602 may receive the information as shown in FIG. 5, and transmit the information to the database module 604. The information may include the network operation data and associated feature data. After receiving the information, the database module 604 may store the network operation data and associated feature data. The data processing module 606 may extract data from database module 604, operate the data pre-processing procedure to generate dataset shown in FIG. 3C, and deliver the dataset to interference estimation model 608.

The interference estimation module 608 may receive dataset from data processing module 606, operate training algorithm as shown in FIG. 4 on the dataset to generate interference model, store the interference model in the form of interference vector or matrix to the database module 604.

Upon receiving scheduling request from a DU, the resource allocation module 610 may extract the interference model from the database module 604, invoke the SINR prediction algorithm to generate the predicted SINR values, and then generate a new resource allocation configuration based on the predicted SINR values. After generating the new resource allocation configuration, the resource allocation module 610 may send the new resource allocation configuration to the at least one transmitter 612 of the apparatus such that the at least one transmitter 612 may transmit the new resource allocation configuration to the DU.

According to some embodiments of the present disclosure, an SINR prediction module can be separated from the resource allocation module to extract interference model from database module 604 and operate SINR prediction algorithm to generate the predicted SINR values. Thus, the resource allocation module may invoke the predicted SINR values to perform resource allocation function.

For intelligent network management, an intelligent enabler should be added to each of the above modules.

According to some embodiments of the present application, iEnabler should be added for the database module. The iEnabler for the database module may track network status update information, check database storage status by checking feature data, maintain database by determining and deleting low quality data and out-of-date data, verify privacy protection for data request from other entities, notify data update to other entities.

According to some embodiments of the present application, iEnabler should be added for the data processing module. The iEnabler for the data processing module may track database status by checking feature data, track network status update information, determine whether the dataset need to be updated or not, and trigger the operation of data processing module if needed.

According to some embodiments of the present application, iEnabler should be added for the interference estimation module. The iEnabler for the interference estimation module may track database status by checking feature data, track network status update information, determine whether the interference model need to be update or not, and trigger the operation of interference estimation module if needed.

According to some embodiments of the present application, iEnabler should be added for the resource allocation module. The iEnabler for the resource allocation module may track database status by checking feature data, track network status update information, determine whether the resource allocation configuration should be updated, and trigger the operation of resource allocation module if needed.

Figure 7:
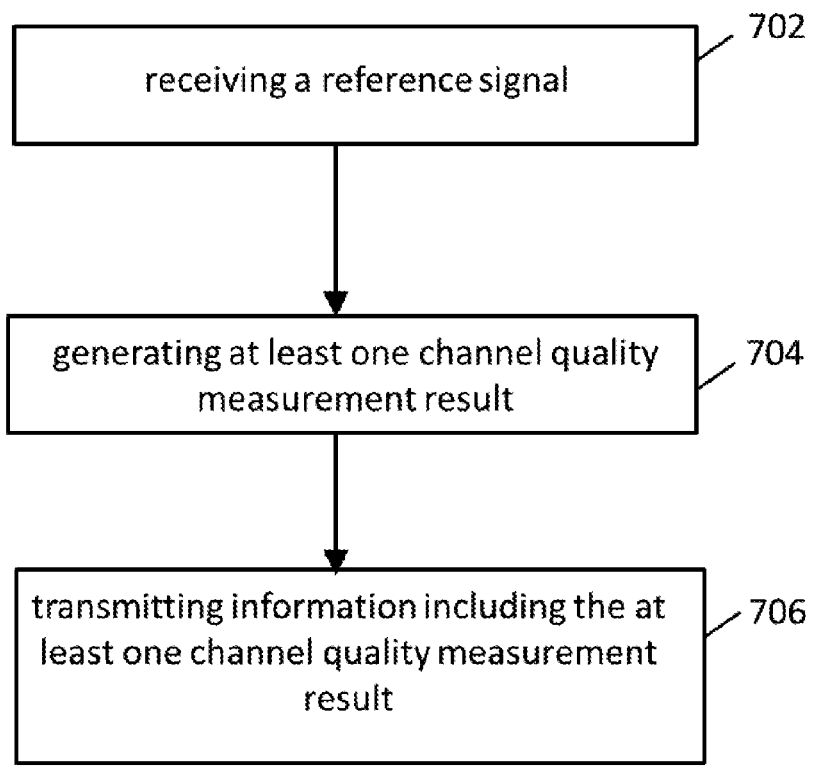
FIG. 7 illustrates a method for uplink interference identification and SINR prediction according to some other embodiments of the present application.

FIG. 7 illustrates a method for uplink interference identification and SINR prediction according to some other embodiments of the present application. The method may be performed by the DU as shown in FIG. 1.

As shown in FIG. 7, in step 702, the DU may receive receiving a reference signal from a UE. As illustrated in FIG. 2, the reference signal may be received on a set of resources according to a current resource allocation configuration. The UE may refer to $u_m$ severed by a $DU_{j_m}$ within a cell $C_{j_m}$.

In step 704, the DU may generate at least one channel quality measurement result based on the reference signal.

According to some embodiments of the present disclosure, each of the at least one channel quality measurement result may be associated with a resource determined by a unit in the time domain and a unit in the frequency domain. The unit in the time domain may correspond to at least one of the following: OFDM symbol, mini-slot, slot, transmission time interval (TTI), sub-frame, and frame. The unit in the frequency domain may correspond to at least one the following: resource element (RE), resource block (RB), sub-channel, resource pool (RP), band width part (BWP), frequency carrier, and frequency band. According to an embodiment of the present disclosure, each of the at least one channel quality measurement result may correspond to a signal to interference plus noise ratio (SINR) value or a reference signal received power (RSRP) value associated with the resource.

In step 706, the DU may transmit information including the at least one channel quality measurement result to its serving CU.

According to some embodiments of the present disclosure, the information may further include feature data, the feature data may include at least one of: at least one timestamp respectively corresponding to the at least one channel quality measurement result; data type; data size; data quality; and data volume.

According to some embodiments of the present disclosure, the information may include an indicator implicitly or explicitly indicating an index of the unit in the time domain and another indicator implicitly or explicitly indicating an index of the unit frequency domain.

After transmitting the information, the DU may receive resource allocation configuration information for the UE from the CU, and then the DU may transmit the resource allocation configuration information to the UE.

Figure 8:
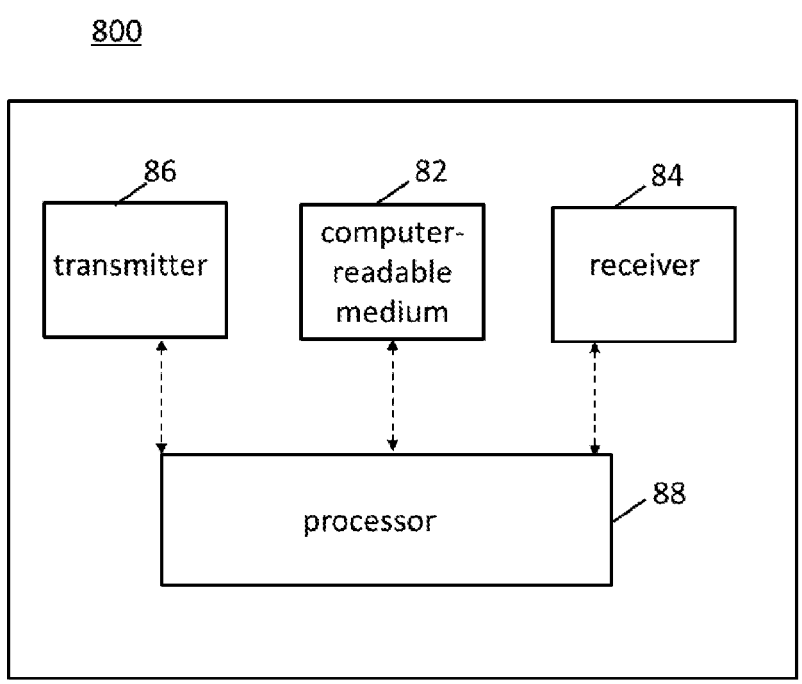
FIG. 8 illustrates a simplified block diagram of an apparatus for uplink interference identification and SINR prediction according to some embodiments of the present application.

FIG. 8 illustrates a simplified block diagram of an apparatus for uplink interference identification and SINR prediction according to some embodiments of the present application. The apparatus 800 may be a CU as shown in FIG. 1.

Referring to FIG. 8, the apparatus 800 may include at least one non-transitory computer-readable medium 82, at least one receiver 84, at least one transmitter 86, and at least one processor 88. In some embodiment of the present application, at least one receiver 84 and at least one transmitter 86 and be integrated into at least one transceiver. The at least one non-transitory computer-readable medium 82 may have computer executable instructions stored therein. The at least one processor 88 may be coupled to the at least one non-transitory computer-readable medium 82, the at least one receiver 84 and the at least one transmitter 86. The computer executable instructions can be programmed to implement a method with the at least one receiver 84, the at least one transmitter 86 and the at least one processor 88 The method can be a method according to an embodiment of the present application, for example, the method shown in FIG. 5.

Figure 9:
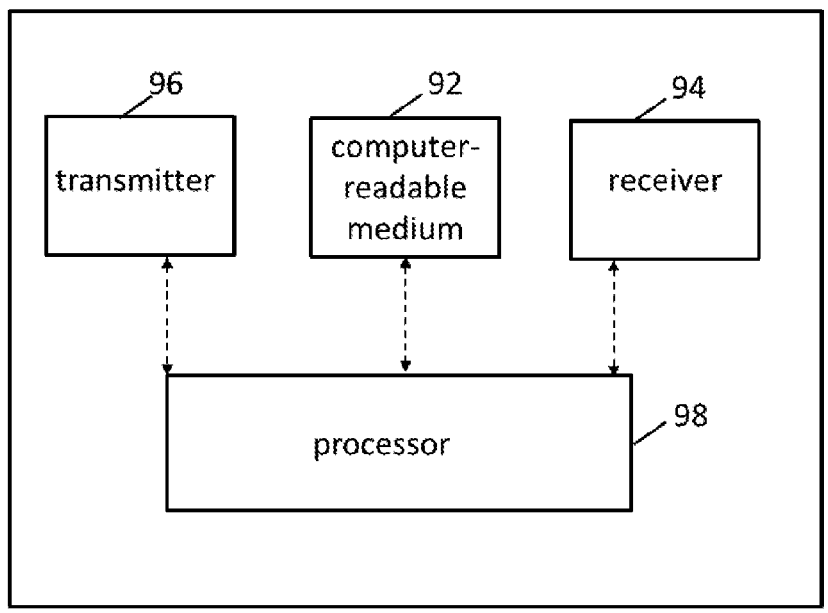
FIG. 9 illustrates a simplified block diagram of an apparatus for uplink interference identification and SINR prediction according to some other embodiments of the present application.

FIG. 9 illustrates a simplified block diagram of an apparatus for uplink interference identification and SINR prediction according to some other embodiments of the present application. The apparatus 900 may be a DU as shown in FIG. 1.

Referring to FIG. 9, the apparatus 900 may include at least one non-transitory computer-readable medium 92, at least one receiver 94, at least one transmitter 96, and at least one processor 98. In some embodiment of the present application, at least one receiver 94 and at least one transmitter 96 and be integrated into at least one transceiver. The at least one non-transitory computer-readable medium 92 may have computer executable instructions stored therein. The at least one processor 98 may be coupled to the at least one non-transitory computer-readable medium 92, the at least one receiver 94 and the at least one transmitter 96. The computer executable instructions can be programmed to implement a method with the at least one receiver 94, the at least one transmitter 96 and the at least one processor 98. The method can be a method according to an embodiment of the present application, for example, the method shown in FIG. 7.

Figure 10A:
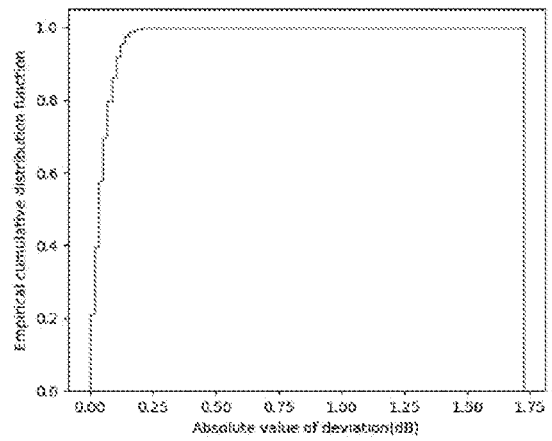
FIGS. 10A-10B illustrates simulation results regarding performance of interference identification according to some other embodiments of the present application.
Figure 10B:
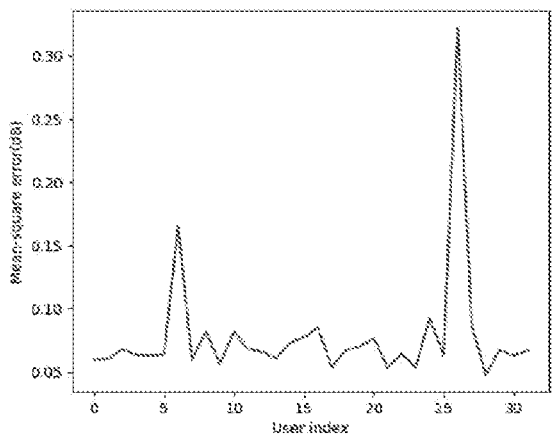
Figure 11A:
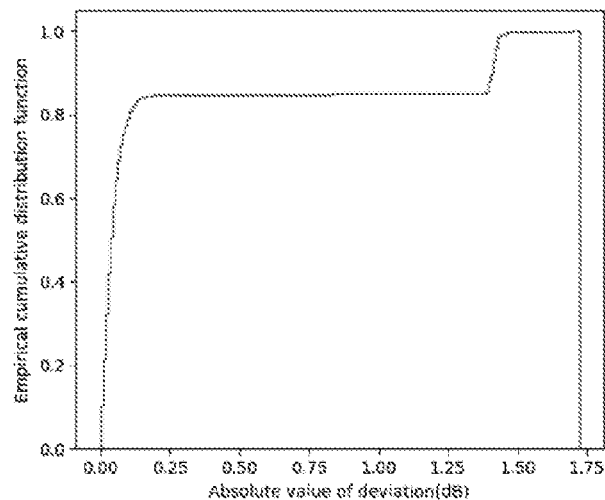
FIGS. 11A-11B illustrates simulation results regarding performance of SINR prediction according to some other embodiments of the present application.
Figure 11B:
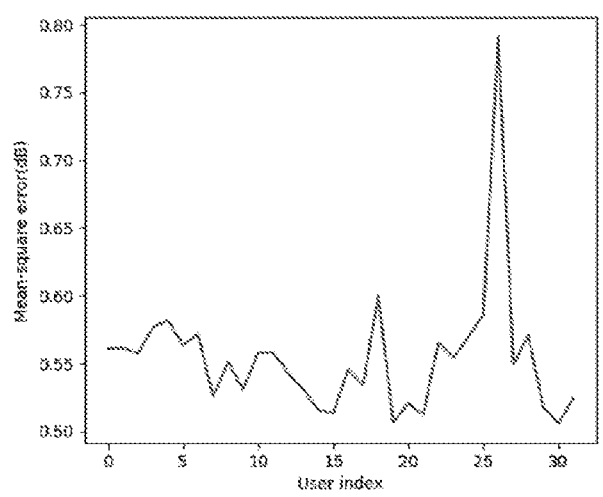
Figure 12A:
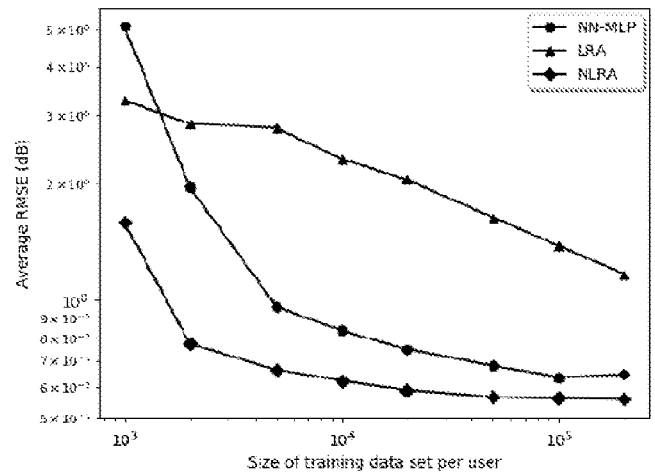
FIGS. 12A-12B illustrates simulation results regarding efficiency and effectiveness of the algorithm proposed in the present disclosure according to some other embodiments of the present application.
Figure 12B:
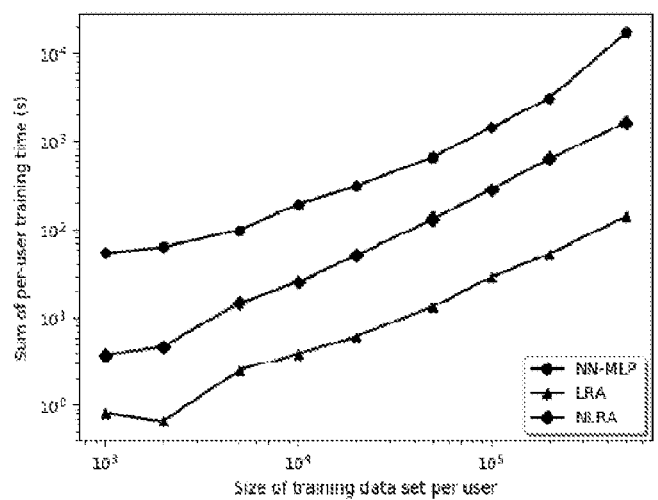

The advantage of the method according to some embodiments of the present application can be well understood with reference to the simulation results as shown in FIGS. 10A-12B. For example, FIGS. 10A-10B illustrates simulation results regarding performance of interference identification according to some other embodiments of the present application; FIGS. 11A-11B illustrates simulation results regarding performance of SINR prediction according to some other embodiments of the present application; and FIGS. 12A-12B illustrates simulation results regarding efficiency and effectiveness of the algorithm proposed in the present disclosure according to some other embodiments of the present application.

The above simulation results may be obtained based on the some parameters used in the simulation. That is, in the simulation, the area severed by the CU may include 4 femtocells per row and 4 rows in total. That is, there are 16 femtocells in the UDN, i.e. J=16. Each femtocell is a square with the side length of 10 m and femtocells are not overlapped. A femtocell access point (FAP) and 2 UEs are randomly placed in each femtocell, and thus I=32. The distance between any 2 FAPs should be no shorter than 8 m. System bandwidth is configured as 5 MHz, consisting with 25 RBs, i.e., K in FIG. 3A-3C is equal to 25. In addition, each UE has a maximum transmission power of 23 dBm (i.e., 200 mW), and the power density of additive Gaussian white noise (AWGN) is −174 dBm/Hz. The channel model is the urban indoor scenario as defined in TR 36.814. The parameters are only used in simulation, and the proposed algorithm is suitable for any ultra-dense network model. Besides, every user uses a 500000-entry dataset to train its interference model, i.e., t in FIG. 3A-3C is equal to 50000.

FIG. 10A illustrates the simulation results regarding the empirical cumulative distribution function of the deviation between the predicted interference value and the ideal interference value. As shown in FIG. 10A, the vertical axis represents the cumulative distribution function empirical, the horizontal axis represents the absolute value of deviation between the predicted interference value and the ideal interference value. According to the simulation results in FIG. 10A, almost all the deviation between the predicted and ideal interference power are below 0.25 dB. That is, the proposed solution could identify the interference very precisely.

FIG. 10B illustrates the simulation results regarding mean-square error (MSE) for each user in the case of interference identification. As shown in FIG. 10B, the vertical axis represents the mean-square error, the horizontal axis represents the user index. According to the simulation results in FIG. 10A, the average MSE of users are below 0.1 dB.

FIG. 11A illustrates the simulation results regarding the empirical cumulative distribution function of the deviation between the predicted SINR value and the actual SINR value. As shown in FIG. 11A, the vertical axis represents the cumulative distribution function empirical, the horizontal axis represents the absolute value of deviation between the predicted SINR value and the ideal interference value. According to the simulation results in FIG. 11A, over 80% of the predictive deviations are less than 0.25 dB. Although there're still over 15% of the predictions deviate ranging from 1 dB to 1.75 dB, almost all of them are SNR predictions (i.e. no other user is sharing the same RB with the selected user). Since the SNR is generally large enough (in the simulation, is more than 70 dB), less than 1.75 dB of error is still not significant. Thus, the proposed solution could do well in SINR prediction.

FIG. 11B illustrates the simulation results regarding mean-square error for each user in the case of SINR prediction. As shown in FIG. 11B, the vertical axis represents the mean-square error, the horizontal axis represents the user index. According to the simulation results in FIG. 10A, the average MSE of users are about 0.55 dB.

To compare the efficiency and effectiveness of the solution in the present application, comparative algorithms are introduced. One is multilayer-perceptron neural network (NN-MLP) algorithm, the other is linear least square regression algorithm (LRA). Algorithm proposed in the present application uses NLRA as an abbreviation.

FIG. 12A illustrates average root MSE (RMSE) of each algorithm under various dataset sizes. As shown in FIG. 12A, NLRA achieves at least 10% higher precision under all dataset sizes compared to NN-MLP, while LRA is far worse than the rest.

FIG. 12B illustrates sum of per-user training time of each algorithm under various dataset sizes. As shown in FIG. 12B, NLRA could finish training with 10 times less time than NN-MLP. Considering its higher precision, NLRA is far better than NN-MLP in all aspects.

Embodiments of the present application provide a non-linear least square regression algorithm. By leveraging the theoretical derivation of the formation of interference model, the algorithm has very high efficiency, with training time comparable with the time span of inputted data. Thus, the real time interference relationship modeling could be achieved by using the proposed method according to embodiments of the present application. Compared with the existing (neural network) NN method suffering error from both inaccurate model expression and noisy data, the method according to embodiments of the present application may only suffer error from noisy data. Moreover, the NN method needs to train both model expression and parameters, while the method according to embodiments of the present application may need to train parameters. In addition, for a NN with 2 hidden layers, using the same dataset, training time would be 10 times longer than our proposed method according to embodiments of the present application.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

The invention claimed is:

1. A method of performing a network function, the method comprising:
receiving first information including at least one channel quality measurement result associated with a first user equipment (UE) depending on interference caused by one or more second UEs; and
determining an interference vector for the first UE based on the at least one channel quality measurement result;
wherein the first information comprises at least one timestamp corresponding to the at least one channel quality measurement result.

2. The method of claim 1, wherein the first information further comprises:
data type;
data size;
data quality; or
data volume;
or a combination thereof.

3. The method of claim 2, wherein the timestamp corresponds to generation time of the channel quality measurement result.

4. The method of claim 1, wherein:
each of the at least one channel quality measurement result is associated with a resource determined by a unit in the time domain and a unit in the frequency domain;

the unit in the time domain corresponds to at least one of the following: orthogonal frequency division multiplexing (OFDM) symbol, mini-slot, slot, transmission time interval (TTI), sub-frame, and frame;
the unit in the frequency domain corresponds to at least one the following: resource element (RE), resource block (RB), sub-channel, resource pool (RP), band width part (BWP), frequency carrier, and frequency band; or
each of the at least one channel quality measurement result corresponds to a signal to interference plus noise ratio (SINR) value or a reference signal received power (RSRP) value associated with the resource;
or a combination thereof.

5. The method of claim 1, wherein the interference vector includes one or more values associated with one or more signal to interference ratio (SIR) values.

6. The method of claim 5, wherein the interference vector further includes a value associated with signal to noise ratio (SNR) value.

7. The method of claim 1, wherein the interference vector for the first UE is determined further based on a first resource allocation configuration for the first UE and the one or more second UEs.

8. The method of claim 1, further comprising:
obtaining at least one predicted signal to interference plus noise ratio (SINR) value for the first UE based on the interference vector, wherein each of the predicted SINR corresponds to a second resource allocation configuration for the first UE and the one or more second UEs;
selecting one of the at least one second resource allocation configurations for the first UE and the one or more second UEs based on the at least one predicted SINR value; and
transmitting second information indicating the selected second resource allocation configuration.

9. The method of claim 1, further comprising:
determining an interference model, wherein the interference model is in the form of an interference matrix comprising the interference vector for the first UE and one or more interference vectors for the one or more second UEs.

10. The method of claim 9, further comprising:
determining whether the interference model need to be updated or not, and
updating the interference model if the interference model is determined to be updated.

11. The method of claim 1, further comprising:
storing the first information in a data base.

12. The method of claim 11, further comprising:
determine whether the data base need to be updated or not, and
updating the data base if the database is determined to be updated.

13. The method of claim 11, further comprising:
tracking network status update information;
checking data base storage status by checking feature data in the data base;
maintaining the data base by determining and deleting low quality data and out-of-date data;
verifying privacy protection for data request to the data base from other entities; or
notifying a data update in the data base to other entities;
or a combination thereof.

14. The method of claim 1, further comprising:
determine whether a resource allocation configuration for the first UE need to be updated or not, and updating the resource allocation configuration for the first UE if the resource allocation configuration is determined to be updated.

15. An apparatus for performing a network function, the apparatus comprising:
at least one memory; and
at least one processor coupled with the at least one memory and configured to cause the apparatus to:
receive a reference signal from a first user equipment (UE);
generate at least one channel quality measurement result based on the reference signal; and
transmit first information including the at least one channel quality measurement result to a centralized unit (CU);
wherein the first information comprises at least one timestamp corresponding to the at least one channel quality measurement result.

16. The apparatus of claim 15, wherein the first information further comprises:
data type;
data size;
data quality; or
data volume;
or a combination thereof.

17. The apparatus of claim 16, wherein the timestamp corresponds to generation time of the channel quality measurement result.

18. The apparatus of claim 15, wherein:
each of the at least one channel quality measurement result is associated with a resource determined by a unit in the time domain and a unit in the frequency domain;
the unit in time the domain corresponds to at least one of the following: orthogonal frequency division multiplexing (OFDM) symbol, mini-slot, slot, transmission time interval (TTI), sub-frame, and frame;
the unit in the frequency domain corresponds to at least one the following: resource element (RE), resource block (RB), sub-channel, resource pool (RP), band width part (BWP), frequency carrier, and frequency band; or
each of the at least one measurement result corresponds to a signal to interference plus noise ratio (SINR) value or a reference signal received power (RSRP) value associated with the resource;
or a combination thereof.

19. An apparatus for performing a network function, the apparatus comprising:
at least one memory; and
at least one processor coupled with the at least one memory and configured to cause the apparatus to:
receive first information including at least one channel quality measurement result associated with a first user equipment (UE) depending on interference caused by one or more second UEs; and
determine an interference vector for the first UE based on the at least one channel quality measurement result;
wherein the first information comprises at least one timestamp corresponding to the at least one channel quality measurement result.

20. A method of performing a network function, the method comprising:
receiving first information including at least one channel quality measurement result associated with a first user equipment (UE) depending on interference caused by one or more second UEs; and
determining an interference vector for the first UE based on the at least one channel quality measurement result;
wherein the first information comprises at least one timestamp corresponding to the at least one channel quality measurement result.

* * * * *